C. B. HOLDEN.
HORSE RAKE.
No. 76,760. Patented Apr. 14, 1868.
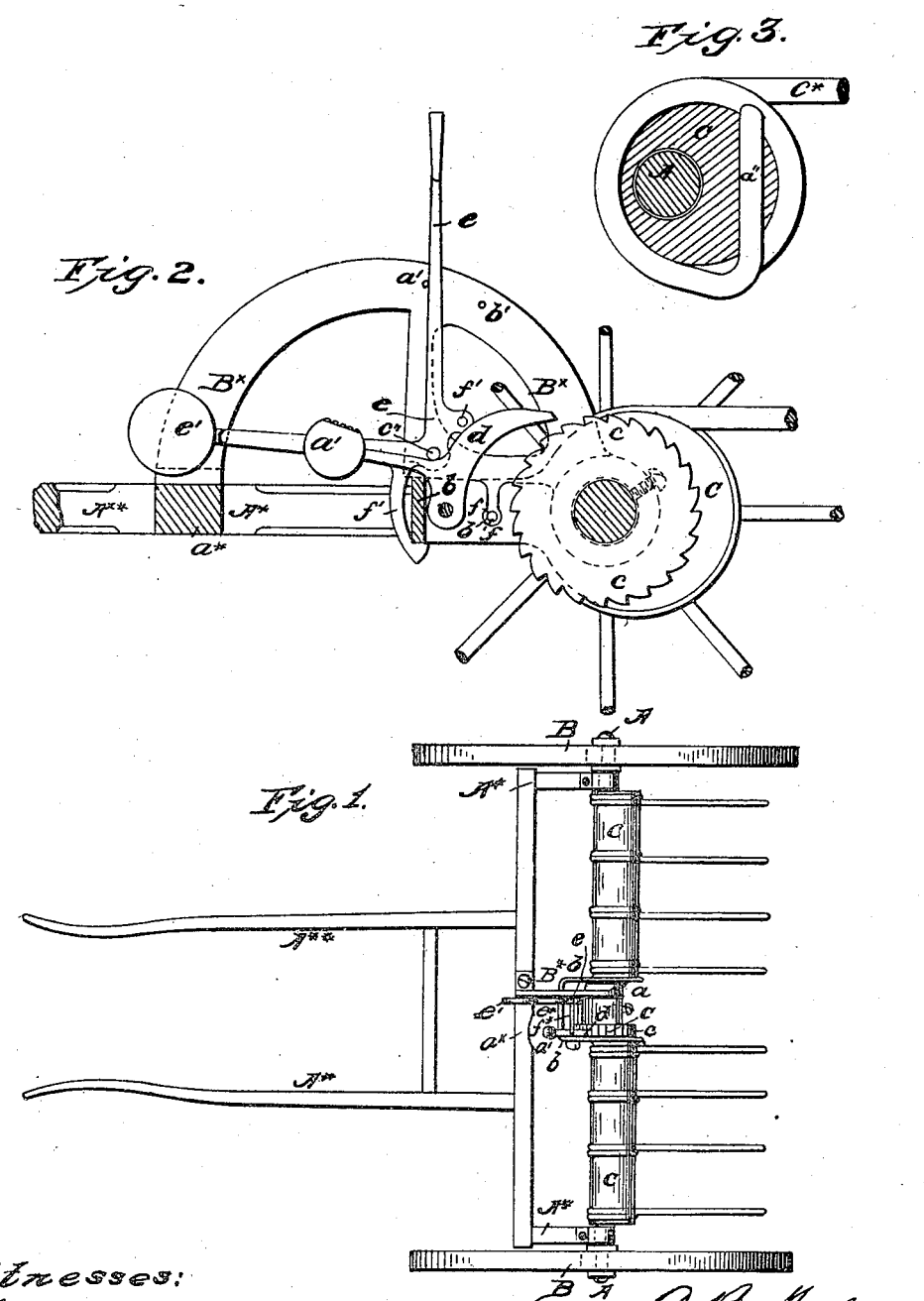

United States Patent Office.

CYRUS B. HOLDEN, OF WORCESTER, MASSACHUSETTS.

Letters Patent No. 76,760, dated April 14, 1868.

IMPROVEMENT IN HORSE-RAKES.

The Schedule referred to in these Letters Patent and making part of the same.

TO ALL WHOM IT MAY CONCERN:

Be it known that I, CYRUS B. HOLDEN, of Worcester, in the county of Worcester, and State of Massachusetts, have invented certain new and useful Improvements in Horse Hay-Rakes; and I do hereby declare that the following is a full, clear, and exact description of the same, reference being had to the accompanying drawings, making a portion of this specification, in which—

Figure 1 is a plan view of a hay-rake, made according to my invention.

Figure 2 is a vertical longitudinal section of the same.

Figure 3 is a transverse section also, on an enlarged scale, of one portion of the same.

Similar letters of reference indicate corresponding parts in all the figures.

This invention relates to that class of wheeled hay-rakes in which the rake-teeth are tilted or lifted to discharge the hay in windrows by the traction of the apparatus, instead of by the employment of muscular force; and it consists in a tubular rake-head, formed of two parts, connected by a suitable yoke, and so combined with the axle of the supporting-wheels, and a ratchet and pawl, as not only to provide for the requisite lifting-movement of the tines, but also to insure a very strong and durable construction of the rake. The invention further consists in certain novel means of insuring the more efficient operation of the mechanism employed in lifting or tilting the rake-teeth, of locking the rake-teeth in their lowered position during the operation of gathering the grass or hay thereon, of securely attaching the rake-teeth to the tubular head, and of providing for the convenient manipulation of the apparatus when in use.

To enable others to understand the construction and operation of my invention, I will proceed to describe it with reference to the drawings.

The rake is formed with a cylindrical axle, A, provided with the two supporting-wheels B, one of which is firmly keyed or otherwise attached to the said axle, while the other is loose thereon. Also attached to the axle A is a horizontal draught-frame, A*, to which are affixed the thills A**, by which the rake is drawn.

C represents a tubular head, of cylindrical form, and the longitudinal bore of which is eccentric to the circumference thereof, as shown more fully in figs. 2 and 3, and has passed through it the axle A, just mentioned. The head C, instead of being formed of one continuous piece, is made in two parts, the innermost ends of which are at some little space apart, as shown at $a$, and which are connected by a forwardly-extending yoke, $b$, as indicated in fig. 1.

The eccentric form, just hereinbefore described, of the tubular head C, causes one side thereof to be much thicker than the other, so that holes may be provided transversely therein, as shown in fig. 3, in such manner that the inner ends $a''$, of the wire teeth C*, may be passed through and secured in such holes, the teeth being coiled one or more times around the aforesaid head, and having their main length or portion of any ordinary or suitable form or curvature.

Attached to the axle in the space $a$, between the two parts of the tubular head, is a ratchet, $c$, and pivoted to one side of the yoke $b$ is a pawl, $d$, provided with a weight, $a'$, which operates to keep the pawl out of gear or contact with the ratchet $c$, except when the same is acted upon by the lever $e$, as hereinafter fully explained. The lever $e$ is pivoted at $c''$ to the lower part of a semicircular vertical frame, B*, which extends from the axle at the space $a$, just hereinbefore mentioned, to the cross-bar $a^*$, of the draught-frame A*, the frame B* having provided upon it two studs, $a'\, b'$, which limit the vibratory movement of the lever. The lever $e$ is formed with a forwardly-extending arm, $e^*$, having at its extremity a weight, $e'$, which tilts forward the lever, which furthermore has at one side a stud or pin, $f^*$, which extends over the pawl $d$, in such manner as to force such pawl into gear with the ratchet $c$, when the lever $e$ is pulled back. Extending downward from the lever $e$ is a hook, $f'$, which, when the lever is thrown forward by the weight $e'$, catches under the front or forward part of the yoke $b$, and thus prevents the rising of the rake-teeth C* while gathering the hay or grass, as hereinafter more fully explained. Provided upon the lower part of the frame B*, and below the pawl $d$, is a stud, $f$.

When the rake is drawn forward with the hook $f'$, under the front of the yoke $b$, the teeth C* are prevented from tilting upward, and the grass or hay is gathered before them, until it is desired to deposit the same in a windrow, whereupon the lever $e$ is moved back, and presses the pawl $d$ into gear or contact with the ratchet $c$. The ratchet $c$, attached to the axle rotated by the wheel B, firmly secured thereto, being thus connected with the pawl $d$ of the head C, carries the same around a portion of a revolution, thereby raising or tilting upward the teeth, and discharging the hay or grass therefrom. By the time this is done, the pawl $d$ strikes the stud $f$, which, by preventing its further movement in a downward direction, brings it clear from the ratchet-wheel $c$, thus enabling the teeth C* to fall by their own weight to their first position. When the lever $e$ is released, it is brought forward to its original place by the weight $e'$, with its hook, $f'$, catching underneath the front of the yoke $b$, to hold the teeth in place while gathering the hay for the next windrow or deposit, while the pawl $d$ is kept clear of the ratchet $c$ by means of its weight $a'$, all as hereinbefore explained.

What I claim as my invention, and desire to secure by Letters Patent, is—

1. The tubular head C, composed of two parts, connected by the yoke $b$, in combination with the axle A, the ratchet $c$, and pawl $d$, substantially as and for the purpose specified.

2. The arrangement and combination of the hook $f'$ and yoke $b$, with the tubular head C, and its teeth C*, substantially as shown and described for the purpose set forth.

3. The tubular head C, arranged eccentrically upon the axle A, in such manner as to permit the innermost ends of the teeth C* to be passed through such tubular head without interfering with the axle, substantially as and for the purpose specified.

C. B. HOLDEN.

Witnesses:
    J. HENRY HILL,
    D. M. WHALING.